United States Patent
Shibata et al.

(10) Patent No.: US 12,136,256 B2
(45) Date of Patent: Nov. 5, 2024

(54) LEARNING APPARATUS, LEARNING METHOD, AND NON-TRANSITORY COMPUTER-READABLE MEDIUM IN WHICH LEARNING PROGRAM HAS BEEN STORED

(71) Applicants: NEC Corporation, Tokyo (JP); KYUSHU UNIVERSITY, NATIONAL UNIVERSITY CORPORATION, Fukuoka (JP)

(72) Inventors: Takashi Shibata, Tokyo (JP); Hiroyoshi Miyano, Tokyo (JP); Eiji Kaneko, Tokyo (JP); Masato Toda, Tokyo (JP); Tsubasa Minematsu, Fukuoka (JP); Atsushi Shimada, Fukuoka (JP); Rin-Ichiro Taniguchi, Fukuoka (JP)

(73) Assignees: NEC CORPORATION, Tokyo (JP); Kyushu University, National University Corporation, Fukuoka (JP)

( * ) Notice: Subject to any disclaimer, the term of this patent is extended or adjusted under 35 U.S.C. 154(b) by 332 days.

(21) Appl. No.: 17/641,913

(22) PCT Filed: Jun. 17, 2020

(86) PCT No.: PCT/JP2020/023844
§ 371 (c)(1),
(2) Date: Mar. 10, 2022

(87) PCT Pub. No.: WO2021/049119
PCT Pub. Date: Mar. 18, 2021

(65) Prior Publication Data
US 2022/0327813 A1    Oct. 13, 2022

(30) Foreign Application Priority Data
Sep. 13, 2019  (JP) ................. 2019-167778

(51) Int. Cl.
*G06V 10/774* (2022.01)
*G06V 10/22* (2022.01)
(Continued)

(52) U.S. Cl.
CPC .......... *G06V 10/7753* (2022.01); *G06V 10/22* (2022.01); *G06V 10/762* (2022.01);
(Continued)

(58) Field of Classification Search
CPC ...... G06V 10/22; G06V 10/25; G06V 10/762; G06V 10/764; G06V 10/774;
(Continued)

(56) References Cited

U.S. PATENT DOCUMENTS

| | | | |
|---|---|---|---|
| 10,380,431 B2 * | 8/2019 | Winter et al. | G06T 7/194 |
| 2019/0130165 A1 * | 5/2019 | Seshadri et al. | G06F 18/24133 |
| 2022/0405586 A1 * | 12/2022 | Yonetani | G06N 3/084 |

FOREIGN PATENT DOCUMENTS

| | | |
|---|---|---|
| JP | 2002-32751 A | 1/2002 |
| JP | 2016-133891 A | 7/2016 |

OTHER PUBLICATIONS

Joseph Redmon, et al., "You Only Look Once: Unified, Real-Time Object Detection", [online], May 9, 2016, [Search on Aug. 27, 2019], Internet<URL: https://arxiv.org/pdf/1506.02640.pdf>, 10 pages.
(Continued)

*Primary Examiner* — Andrew W Johns
(74) *Attorney, Agent, or Firm* — Sughrue Mion, PLLC

(57) ABSTRACT

A learning apparatus (500) according to the present invention includes a detection unit (510) that detects, as a candidate region of a learning target, a region detected by one of first detection processing of detecting an object region from a predetermined image and second detection processing of detecting a change region from background image information and the image, and not detected by the other, an output
(Continued)

unit (520) that outputs at least a part of the candidate region as a labeling target, and a learning unit (530) that learns a model for performing the first detection processing or a model for performing the second detection processing by using the labeled candidate region as learning data.

18 Claims, 9 Drawing Sheets

(51) Int. Cl.
  *G06V 10/762* (2022.01)
  *G06V 10/764* (2022.01)
  *G06V 20/70* (2022.01)
(52) U.S. Cl.
  CPC ............ *G06V 10/764* (2022.01); *G06V 20/70* (2022.01); *G06V 2201/07* (2022.01)
(58) Field of Classification Search
  CPC ................ G06V 10/7753; G06V 20/70; G06T 2207/20081; G06N 20/00
  See application file for complete search history.

(56) References Cited

OTHER PUBLICATIONS

Pierre-Luc St-Charles, et al., "A Self-Adjusting Approach to Change Detection Based on Background Word Consensus", [online], Jun. 7, 2016, [Search on Aug. 27, 2019], Internet<URL: https://www.researchgate.net/profile/Pierre_Luc_St-Charles/publication/271138379_A_Self-Adjusting_Approach_to_Change_Detection_Based_on_Background_Word_Consensus/links/5756e95208ae5c65490407a2/A-Self-Adjusting-Approach-to-Change-Detection-Based-on-Background-Word-Consensus.pdf>, 9 pages.

Evan Shelhamer, et al., "Fully Convolutional Networks for Semantic Segmentation", [online], May 20, 2016, [Search on Aug. 27, 2019], Internet<URL: https://arxiv.org/pdf/1605.06211.pdf> , pp. 1-12.

International Search Report for PCT/JP2020/023844 dated Sep. 8, 2020 (PCT/ISA/210).

* cited by examiner

LEARNING APPARATUS, LEARNING METHOD, AND NON-TRANSITORY COMPUTER-READABLE MEDIUM IN WHICH LEARNING PROGRAM HAS BEEN STORED

CROSS REFERENCE TO RELATED APPLICATIONS

This application is a National Stage of International Application No. PCT/JP2020/023844 filed Jun. 17, 2020, claiming priority based on Japanese Patent Application No. 2019-167778 filed Sep. 13, 2019, the disclosure of which is incorporated herein in its entirety by reference.

TECHNICAL FIELD

The present invention relates to a learning apparatus, a learning method, and a learning program, and more particularly, to a learning apparatus, a learning method, and a learning program for object recognition.

BACKGROUND ART

An object recognition technique of detecting a target object in an image acquired by an imaging device such as a camera has been known. For example, Non Patent Literature 1 discloses an object recognition technique of performing learning and detection by using a multilayer neural network. A background subtraction technique has been known as a technique of detecting a change before and after a frame acquired by an imaging device such as a camera. For example, Non Patent Literature 2 discloses a background subtraction technique. Further, Non Patent Literature 3 discloses a technique related to semantic segmentation in which detection is performed for each pixel.

CITATION LIST

Non Patent Literature

[Non Patent Literature 1] Redmon, Joseph, et al. "You Only Look Once: Unified, Real-Time Object Detection," [online], 9 May 2016, [Search on Aug. 27, 2019].
[Non Patent Literature 2] P.-L. St-Charles, G.-A. Bilodeau, and R. Bergevin, "A Self-Adjusting Approach to Change Detection Based on Background Word Consensus", [online], 7 Jun. 2016, [Search on Aug. 27, 2019].
[Non Patent Literature 3] Evan Shelhamer, Jonathan Long, Trevor Darrell, "Fully Convolutional Networks for Semantic Segmentation," [online], 20 May 2016, [Search on Aug. 27, 2019].

SUMMARY OF INVENTION

Technical Problem

Herein, in an object recognition technique, there is a problem that it is difficult to improve recognition accuracy of an unknown object that has not been learned as an identification target.

The present disclosure has been made in order to solve such a problem, and an object of the present disclosure is to provide a learning apparatus, a learning method, and a learning program for improving a recognition rate of an object in an image.

Solution to Problem

A learning apparatus according to a first aspect of the present disclosure includes:
   a detection unit that detects, as a candidate region of a learning target, a region detected by one of first detection processing of detecting an object region from a predetermined image and second detection processing of detecting a change region from background image information and the image, and not detected by the other;
   an output unit that outputs at least a part of the candidate region as a labeling target; and
   a learning unit that learns a model for performing the first detection processing or a model for performing the second detection processing by using the labeled candidate region as learning data.

A learning method according to a second aspect of the present disclosure includes, by a computer:
   detecting, as a candidate region of a learning target, a region detected by one of first detection processing of detecting an object region from a predetermined image and second detection processing of detecting a change region from background image information and the image, and not detected by the other;
   outputting at least a part of the candidate region as a labeling target; and
   learning a model for performing the first detection processing or a model for performing the second detection processing by using the labeled candidate region as learning data.

A learning program according to a third aspect of the present disclosure causes a computer to execute:
   processing of detecting, as a candidate region of a learning target, a region detected by one of first detection processing of detecting an object region from a predetermined image and second detection processing of detecting a change region from background image information and the image, and not detected by the other;
   processing of outputting at least a part of the candidate region as a labeling target; and
   processing of learning a model for performing the first detection processing or a model for performing the second detection processing by using the labeled candidate region as learning data.

Advantageous Effects of Invention

According to the present disclosure, a learning apparatus, a learning method, and a learning program for improving a recognition rate of an object in an image can be provided.

DESCRIPTION OF EMBODIMENTS

Figure 1:
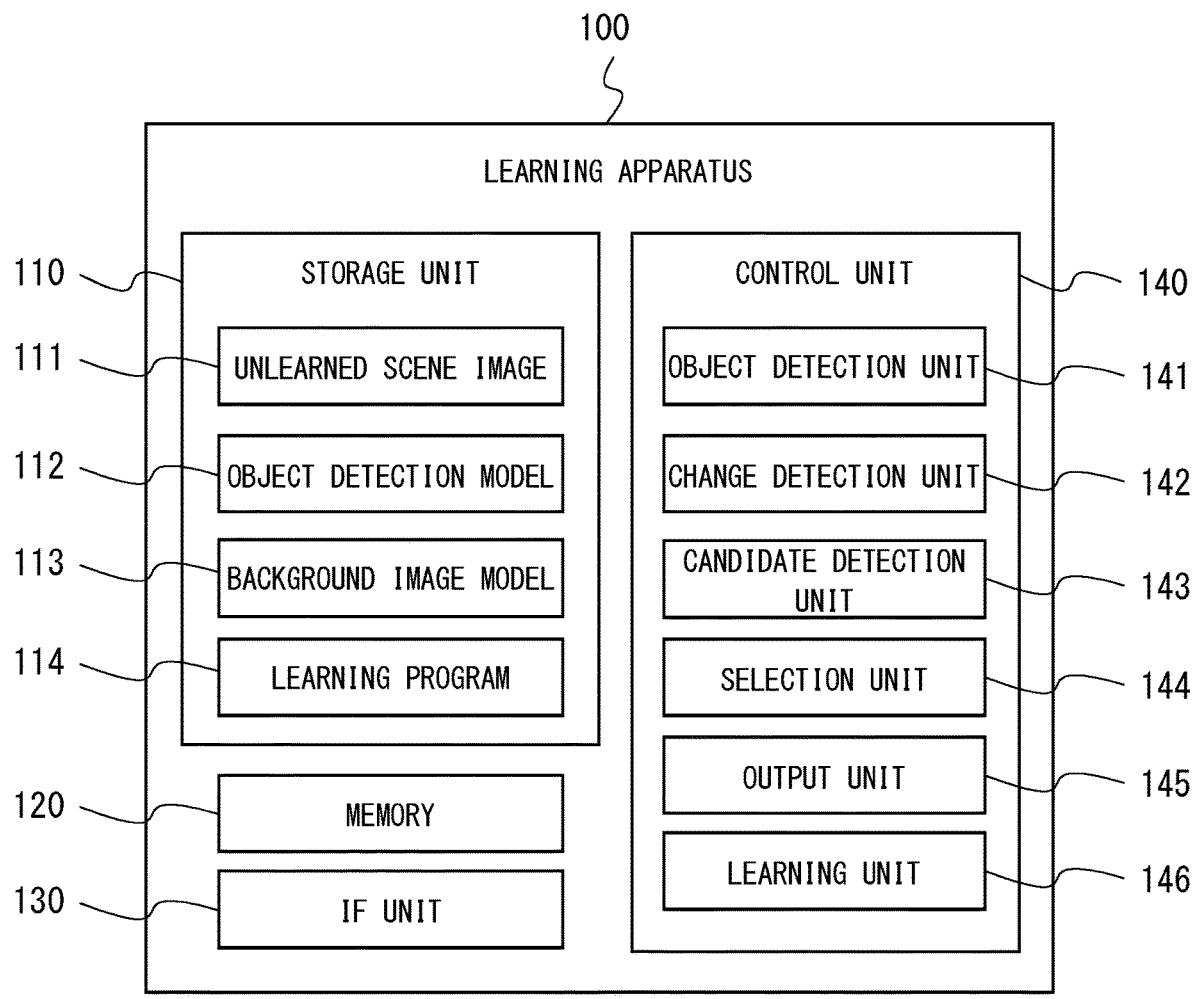
FIG. 1 is a block diagram illustrating a configuration of a learning apparatus according to a first example embodiment.

Hereinafter, example embodiments of the present disclosure will be described in detail with reference to the drawings. In the drawings, the same or corresponding elements are denoted by the same reference signs, and duplicate descriptions are omitted as necessary for clarity of description.

First Example Embodiment

FIG. 1 is a block diagram illustrating a configuration of a learning apparatus 100 according to a first example embodiment. The learning apparatus 100 is an information processing apparatus that detects a candidate region of a learning target from image data that has not been learned in a plurality of object recognition models, presents at least a part of the candidate region to a user, and performs learning of an object recognition model in response to labeling of the candidate region by a user. The learning apparatus 100 includes a storage unit 110, a memory 120, an interface (IF) unit 130, and a control unit 140.

The storage unit 110 is a storage device such as a hard disk, a flash memory, or the like. The storage unit 110 stores an unlearned scene image 111, an object detection model 112, a background image model 113, and a learning program 114. The unlearned scene image 111 is a set of images captured by an imaging device such as a camera, and is a set of images that have not been learned in at least either one of the object detection model 112 and the background image model 113.

The object detection model 112 is a program module or a model expression in which first detection processing of detecting an object region from a predetermined image is implemented. The object detection model 112 is a mathematical model in which a feature amount extracted from any one image is used as input data, and a predetermined parameter (weighting coefficient) is used for calculating each input data. Then, the object detection model 112 outputs an object region being a region in which an object is detected, as a calculation result. Further, it is assumed that the object detection model 112 has been learned in advance by a data set of a plurality of general scene images. Note that, the object detection model 112 is achieved by a neural network, a support vector machine, or the like. For example, the object detection model 112 may be achieved by a technique such as Non Patent Literature 1.

The background image model 113 is a program module or a model expression in which second detection processing of detecting a change region from background image information and an input image is implemented. The background image model 113 is a mathematical model in which a feature amount extracted from any one image is used as input data, and a predetermined parameter (weighting coefficient) is used for calculating each input data. Then, the background image model 113 outputs a change region being a region changed from a background, based on the difference from the background, as a calculation result. Further, it is assumed that the background image model 113 has been learned in advance by a data set of a plurality of general background images. Note that, the background image model 113 is achieved by a neural network, a support vector machine, or the like. For example, the background image model 113 may be achieved by a technique such as Non Patent Literature 2. Further, the background image model 113 may be referred to as background image information.

The learning program 114 is a computer program on which processing of a learning method according to the present example embodiment is implemented.

The memory 120 is a volatile storage device such as a random access memory (RAM), and is a storage region for transitorily holding information during operation of the control unit 140. The IF unit 130 is an interface for performing input and output data with an outside of the learning apparatus 100. For example, the IF unit 130 accepts a user operation via an input device (not illustrated) such as a keyboard, a mouse, or a touch panel, and outputs an accepted operation content to the control unit 140. In addition, the IF unit 130 performs output to a touch panel, a display device, a printer, or the like (not illustrated) in response to an instruction from the control unit 140. Alternatively, the IF unit 130 may perform input and output with other information processing apparatus connected via a communication line.

The control unit 140 is a processor, that is, a control device, that controls each configuration of the learning apparatus 100. The control unit 140 causes the memory 120 to read the learning program 114 from the storage unit 110, and executes the learning program 114. As a result, the control unit 140 achieves functions of an object detection unit 141, a change detection unit 142, a candidate detection unit 143, a selection unit 144, an output unit 145, and a learning unit 146.

The object detection unit 141 inputs the unlearned scene image 111 to the object detection model 112, and executes the first detection processing. When an object is detected from the unlearned scene image 111 by the object detection model 112, the object detection unit 141 acquires information (object region) specifying a rectangular region including the object. Note that, the object region is not limited to a rectangle, and may be represented by a set of coordinates or the like for specifying the region.

The change detection unit 142 inputs the unlearned scene image 111 to the background image model 113, and executes the second detection processing. When a difference between the unlearned scene image 111 and background image information is detected by the background image model 113, the change detection unit 142 acquires information (difference region) specifying a rectangular region including the difference. Further, it may be referred that the change detection unit 142 detects a region (change region) that has changed from the background image information in the unlearned scene image 111. Note that, the difference region or the change region is not limited to a rectangle, and may be represented by a set of coordinates or the like for specifying the region. For example, the object detection unit 141 or the change detection unit 142 may detect, as a region, a shape of a human-type instead of a rectangle by using a semantic segmentation technique such as Non Patent Literature 3.

The candidate detection unit 143 detects, as a candidate region of a learning target, a region detected by one of the first detection processing (the object detection model 112 or the object detection unit 141) and the second detection processing (the background image model 113 or the change detection unit 142), and not detected by the other. For example, the candidate detection unit 143 detects, as unknown object candidate regions, a set of regions detected by the second detection processing and not detected by the first detection processing. Herein, first, a "known object region" is defined as a region being detected by the object detection unit 141 and a region applying a correct object label. The "unknown object candidate region" is defined as a region which does not satisfy a definition of the "known object region", for example, a region to which an erroneous label is applied in the first detection processing, a region being detected in the second detection processing and whose label is unknown, or the like. In addition, the candidate detection unit 143 detects, as a change region candidate (change detection failure region), a region detected by the first detection processing and not detected by the second detection processing. In other words, the candidate region includes the unknown object candidate region and the change region candidate. Note that, the candidate region preferably includes at least either one of the unknown object candidate region and the change region candidate.

In addition, the candidate detection unit 143 preferably detects, as the candidate region, a region based on a degree of overlap between a first region detected by the first detection processing and a second region detected by the second detection processing. For example, when one region is included in the other region, the one region may be the candidate region. Alternatively, it is not limited to the degree of overlap, and the candidate region may be detected according to correlation of a shape or a size, or the like. Further, for example, when a size of the first region is remarkably larger than a size of the second region, the candidate detection unit 143 may detect the second region as the unknown object candidate region. In other words, when a size of the detection region (object region) of an object detection is remarkably larger than a size of the detection region (change region) of a change detection in the region detected by both of the object detection unit 141 and the change detection unit 142, the change region may be detected as an unknown object candidate area.

The selection unit 144 selects, as a representative region, a part of a plurality of unknown object candidate regions from among the candidate regions detected by the candidate detection unit 143. In this manner, by narrowing down a labeling target, it is possible to reduce a burden of labeling by a user. Then, the selection unit 144 according to the present example embodiment performs clustering on a plurality of unknown object candidate regions, and selects a representative region according to a clustering result. For example, the selection unit 144 calculates a feature amount (feature vector) for each unknown object candidate region, and performs clustering for the feature vector. As a result, each feature vector is classified into one of a plurality of clusters. Then, the selection unit 144 selects a center, a center of gravity, or a random point from each cluster, and sets a region corresponding to the selected point as a representative region. In other words, a representative region may be selected for each cluster. In this manner, a similar candidate region is excluded, and a labeling burden can be reduced. Further, the selection unit 144 preferably select a region classified into a cluster whose label is unknown by clustering as the representative region. As a result, the unknown label can be efficiently applied, and learning efficiency is improved. Note that, the selection unit 144 may exclude a region classified into a cluster whose label is known from the representative region. In this manner, noise is removed. At least the selection unit 144 preferably and preferentially select a region classified into a cluster whose label is unknown as the representative region.

Further, the selection unit 144 preferably and preferentially select a region within a predetermined range from each of centers of a plurality of clusters by clustering as the representative region. In this manner, a region in which it is more difficult to discriminate a cluster is prioritized, and labeling efficiency is improved. Alternatively, the selection unit 144 may perform clustering on a plurality of unknown object candidate regions from a plurality of viewpoints, and preferentially select, as the representative region, a region classified into a different cluster in each viewpoint from among the plurality of unknown object candidate regions. As a result, since a user preferentially determines and labels a region having a high possibility of being equivalent to a plurality of labels, accuracy as learning data is improved.

Further, the selection unit 144 may select, as the representative region, a part of the unknown object candidate region classified into the same cluster by clustering. Since there is a high possibility that the labels of the unknown object candidate regions classified into the same cluster are common, labeling can be made efficient.

Note that, the selection unit 144 may select a representative region randomly from a plurality of unknown object candidate regions without performing clustering. Herein, the number of representative regions to be selected or the number of clusters in a case of clustering may be determined according to, for example, working man-hour of a user who performs labeling.

The output unit 145 outputs at least a part of the candidate region as a labeling target. In particular, the output unit 145 outputs the representative region as a labeling target. Further, the output unit 145 outputs a change region candidate as a labeling target. Herein, the output unit 145 preferably and collectively outputs a plurality of representative regions classified into the same cluster by clustering as the same labeling target. Since there is a high possibility that labels of the unknown object candidate regions classified into the same cluster are common, labeling can be made efficient. Further, when clustering of a plurality of viewpoints is performed by the selection unit 144, the output unit 145 outputs a plurality of label candidates corresponding to each cluster in which the representative region is classified, together with the representative regions. In this manner, it becomes easier for a user to designate a plurality of labels for a specific representative region, and a user can generate more effective learning data for performing learning using a soft label or a multi-label.

The learning unit 146 accepts a label designated for each candidate region from a user via an input device or the like, and learns a model (object detection model 112) for performing first detection processing or a model (background image model 113) for performing second detection processing by using the labeled candidate region as learning data. Herein, various general methods can be used for machine learning. For example, the learning unit 146 may re-learn the model (the object detection model 112) for performing the first detection processing or the mode (the background image model 113)1 for performing the second detection processing by using the learning data to which the label designated for each candidate region from a user via the input device or the like is attached, and the learning data originally used for generating the model for performing the first detection processing or the model for performing the second detection processing. Note that, the learning data originally used for learning the model for performing the first detection processing or the model for performing the second detection processing and used in the re-learning may be replaced with a general learning data set. In other words, the learning unit 146 performs machine learning on the object detection model 112 or the background image model 113 by using the candidate region and a correct answer label as training data. In other words, the learning unit 146 updates a parameter in such a way as to optimize the object detection model 112 or the background image model 113 by using the learning data. Then, the learning unit 146 updates the storage unit 110 with the object detection model 112 or the background image model 113 after learning.

More specifically, the learning unit 146 learns the model for performing the first detection processing by using the labeled representative region as the learning data. Herein, when a part of the unknown object candidate region classified into the same cluster is selected as the representative region by the selection unit 144, the learning unit 146 attaches the label attached to the representative region to other unknown object candidate region classified into the same cluster, and sets as the learning data. In addition, the learning unit 146 learns the model for performing the second detection processing by using the labeled change region candidate as the learning data.

Figure 2:
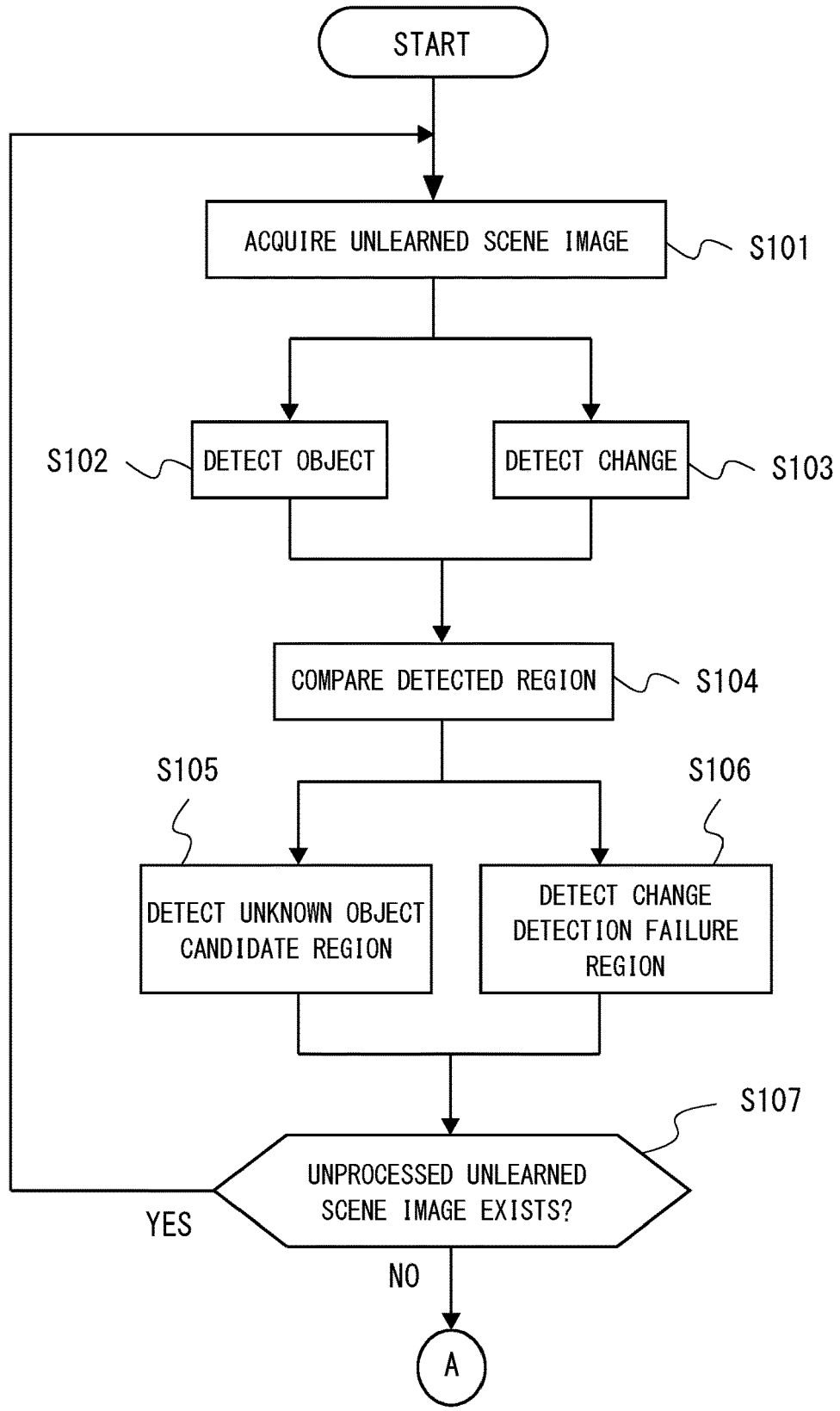
FIG. 2 is a flowchart illustrating a flow of a first half of a learning method according to the first example embodiment.

FIG. 2 is a flowchart illustrating a flow of a first half of the learning method according to the first example embodiment. First, the control unit 140 of the learning apparatus 100 acquires the unlearned scene image 111 from the storage unit 110 (S101). Next, the object detection unit 141 performs the first detection processing to attempt detection of an object region from the unlearned scene image 111 (S102). Herein, the object detection unit 141 may detect a plurality of object regions from one image. Note that, when the object detection unit 141 detects an object region, the object detection unit 141 transitorily stores the detected object region in the storage unit 110 or the memory 120.

Figure 3:
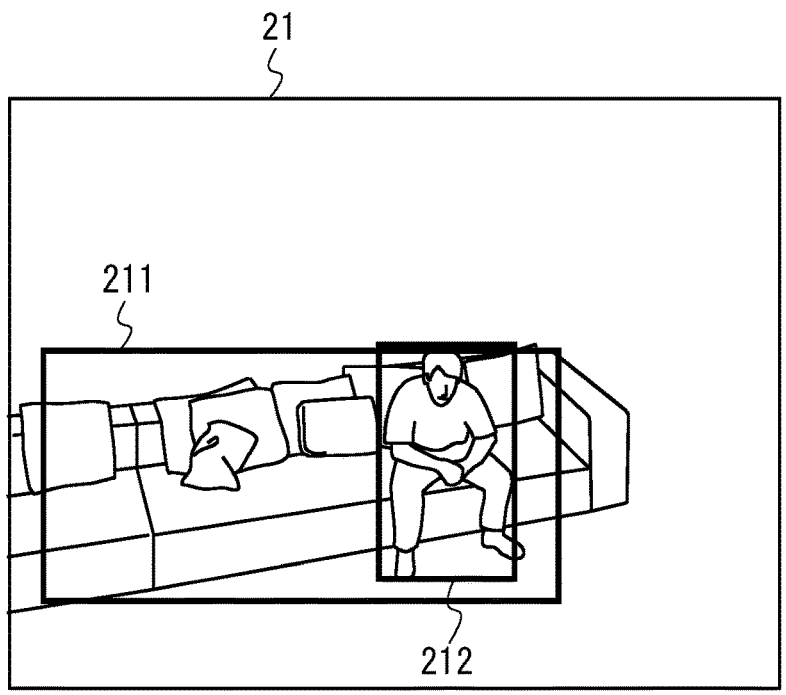
FIG. 3 is a diagram illustrating an example of a detected object region according to the first example embodiment.

FIG. 3 is a diagram illustrating an example of a detected object region according to the first example embodiment. Herein, it is illustrated that object regions 211 and 212 are detected in an object detection target frame 21. The object region 211 illustrates a region in which a label "sofa" is detected. The object region 212 illustrates a region in which a label "person" is detected.

In parallel with the step S102, the change detection unit 142 performs the second detection processing to attempt detection of a change region from the unlearned scene image 111 (S103). Herein, the change detection unit 142 may detect a plurality of change regions from one image. Note that, when the change detection unit 142 detects a change region, the change detection unit 142 transitorily stores the detected change region in the storage unit 110 or the memory 120.

Figure 4:
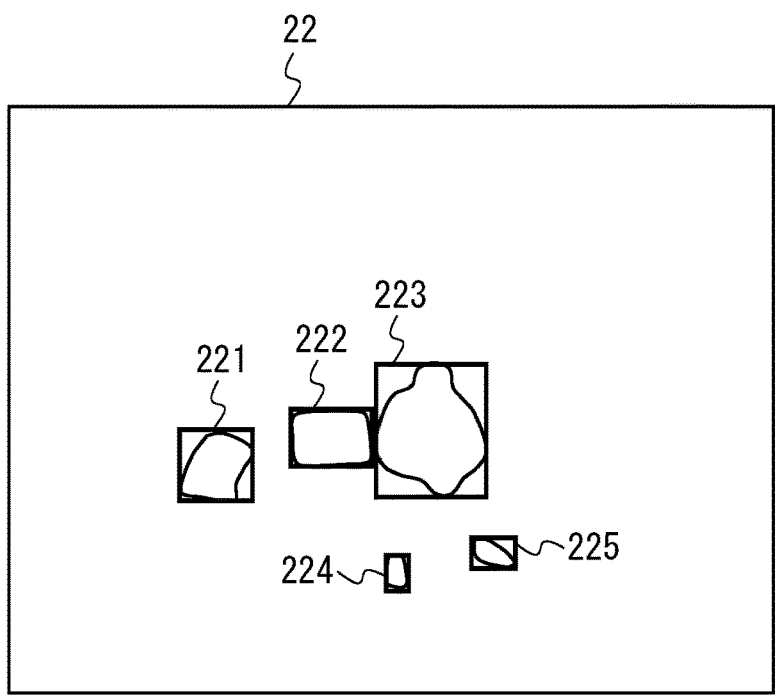
FIG. 4 is a diagram illustrating an example of a detected change region according to the first example embodiment.

FIG. 4 is a diagram illustrating an example of a detected change region according to the first example embodiment. Herein, it is illustrated that change regions 221 to 225 are detected in a change detection target frame 22. Since a sofa is regarded as a background, the change region 221 is equivalent to the foreground of a "bag" on the sofa. Similarly, the change region 222 is equivalent to the foreground of a "cushion" on the sofa. The change regions 223, 224, and 225 are equivalent to the foreground of the person, but both legs are not detected because both legs have the same color as the cushion as the background, and it is illustrated that the change regions 223 to 225 are detected as different regions from the person.

After the steps S102 and S103, the candidate detection unit 143 compares the detected object region with the detected change region (S104). For example, the candidate detection unit 143 selects one of the plurality of object regions detected in the step S102 as a comparison target, and calculates a degree of coincidence or a degree of overlap between the comparison target and each of the plurality of change regions detected in the step S103. Then, the candidate detection unit 143 performs similar comparison for all of the plurality of object regions. Similarly, the candidate detection unit 143 calculates the degree of coincidence or the degree of overlap with each of the plurality of object regions and each of the plurality of change regions as a comparison target. Note that, the candidate detection unit 143 may exclude a region that has already been learned as a background in the background image model 113 from the plurality of object regions detected in the step S102.

When an object region whose degree of coincidence with the change region is equal to or more than a predetermined value does not exist, the candidate detection unit 143 detects the change region as an unknown object candidate region (S105). Further, when an object region having an inclusive relationship with the change region exists, the candidate detection unit 143 may also detect the change region as an unknown object candidate region.

Figure 5:
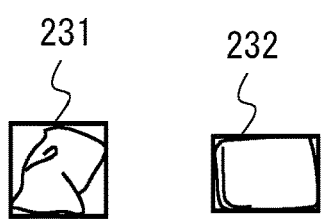
FIG. 5 is a diagram illustrating an example of a detected unknown object candidate region according to the first example embodiment.

FIG. 5 is a diagram illustrating an example of a detected unknown object candidate region according to the first example embodiment. Herein, it is illustrated that unknown object candidate regions 231 and 232 are detected. Note that, it is assumed that the object region 211 has already been learned as a background in the background image model 113, and thus has been removed from the comparison target. It is illustrated that the unknown object candidate region 231 is detected as a candidate region because the object region does not exist at a position corresponding to the change region 221. Similarly, it is illustrated that the unknown object candidate region 232 is detected as a candidate region because the object region does not exist at a position corresponding to the change region 222. Note that, the object region 212 in FIG. 3 and the change regions 223 to 225 in FIG. 4 are not detected as unknown object candidate regions because they are detected in both object detection and change detection as person regions.

Further, when a change region whose degree of coincidence with the object region is equal to or more than a predetermined value does not exist, the candidate detection unit 143 detects the object region as a change detection failure region (S106). Note that, when the unknown object candidate region and the change detection failure region are detected, the candidate detection unit 143 transitorily stores the detected region, as a candidate region, in the storage unit 110 or the memory 120.

Then, the control unit 140 determines whether an unprocessed unlearned scene image 111 exists (S107). When it is determined to exist, the process returns to the step S101. When it is determined in the step S107 not to exist, the process proceeds to a second half of the learning method described later.

Figure 6:
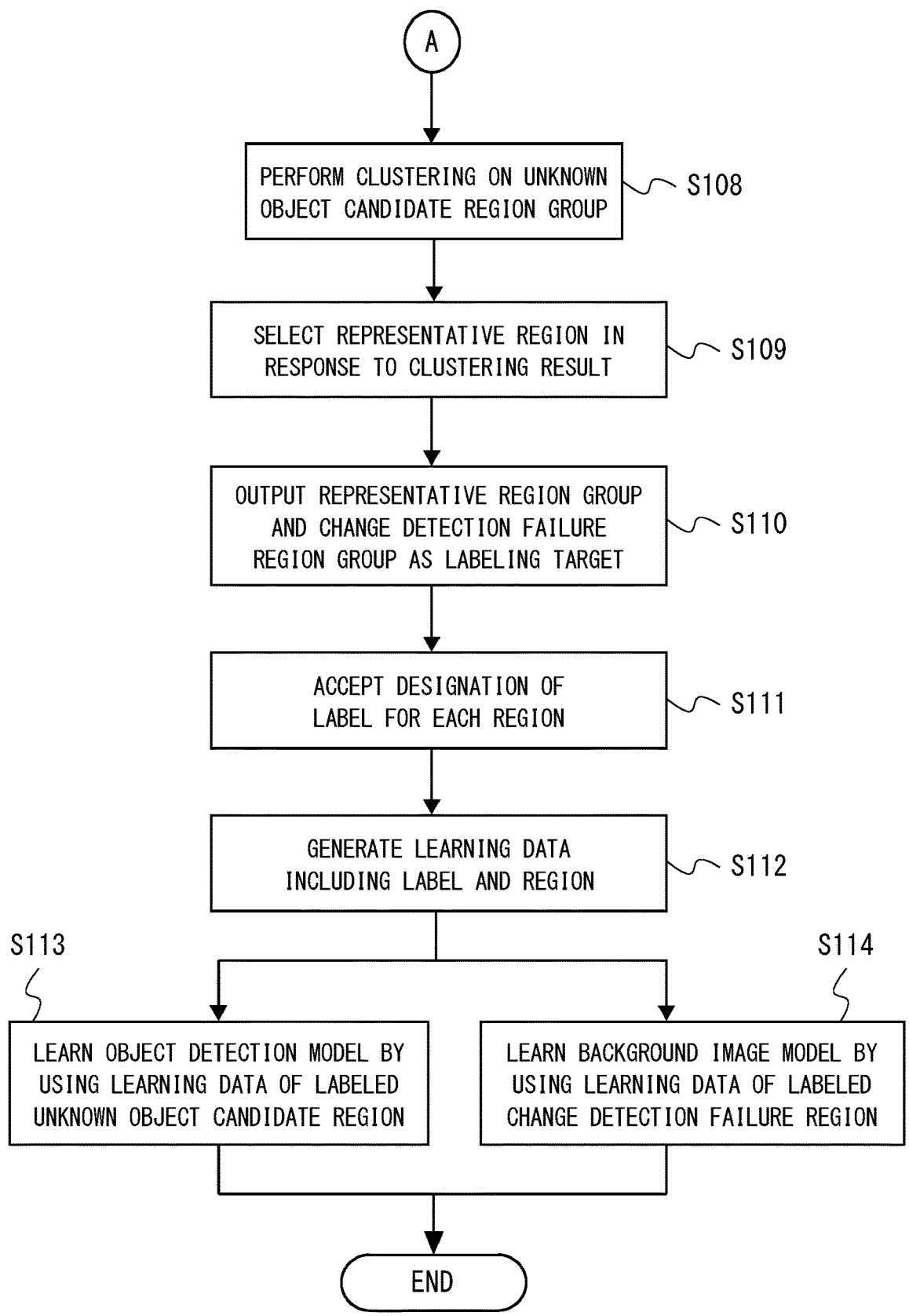
FIG. 6 is a flowchart illustrating a flow of a second half of the learning method according to the first example embodiment.

FIG. 6 is a flowchart illustrating a flow of the second half of the learning method according to the first example embodiment. When it is determined in the step S107 that an unprocessed unlearned scene image 111 does not exist, the selection unit 144 performs clustering on an unknown object candidate region group (S108). As a clustering method, for example, a known technique such as a K-means method can be used. Then, the selection unit 144 selects a representative region in response to a clustering result (S109). For example, the selection unit 144 selects the unknown object candidate region being equivalent to a center point of each cluster as the representative region. Alternatively, the selection unit 144 may select a region classified into a cluster whose label is unknown by clustering as the representative region.

Figure 7:
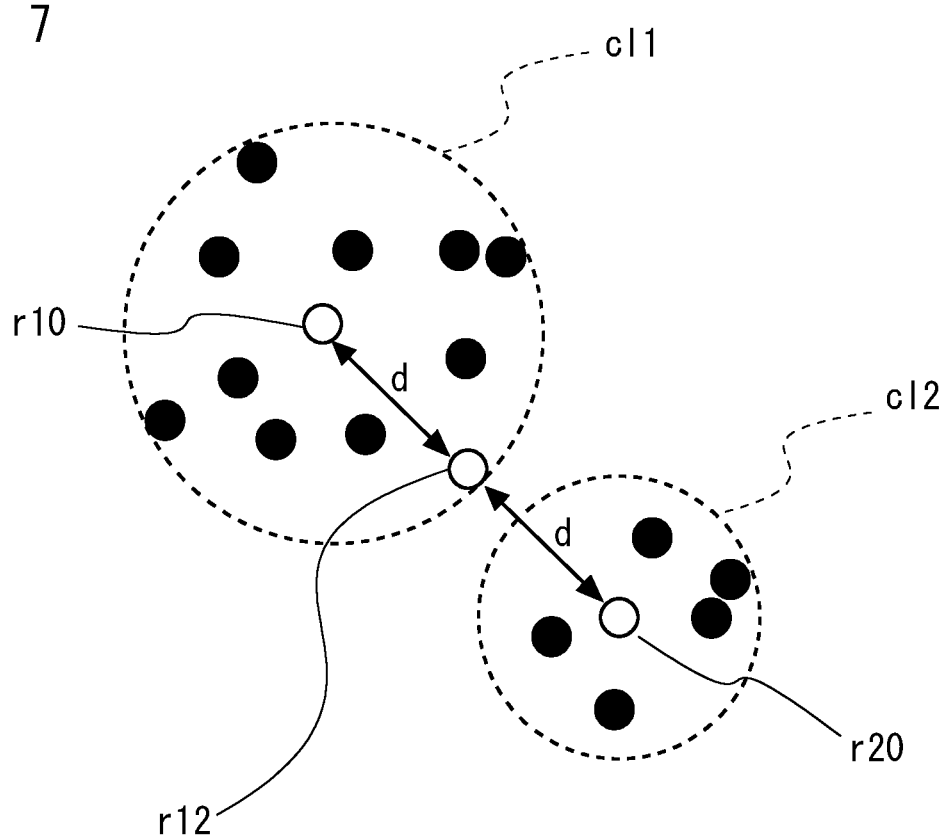
FIG. 7 is a diagram illustrating an example of selection of a representative region in clustering according to the first example embodiment.

Alternatively, the selection unit 144 may preferentially select, as the representative region, a region within a predetermined range from each of the centers of a plurality of clusters by clustering. FIG. 7 is a diagram illustrating an example of selection of a representative region in clustering according to the first example embodiment. Herein, a point r12 is classified into a cluster cl1, and is in a range of a predetermined distance d from a center point r10. The point r12 is also within the range of the predetermined distance d from a center point r20 of another cluster cl2. In such a case, it is desirable for a user to actually determine whether the point r12 is classified into the cluster cl1 or cl2 (which label is appropriate). Therefore, in the case in FIG. 7, the selection unit 144 preferably select a region corresponding to the point r12 as the representative region. Note that, the point r12 may not be equidistant from the center points r10 and r20.

Alternatively, the selection unit 144 may perform clustering on the unknown object candidate region group from a plurality of viewpoints. Herein, a viewpoint of clustering is, for example, a parameter setting value, a clustering method, the number of clusters, or the like. Then, when a point classified into a certain cluster by clustering of a first viewpoint is classified into another cluster by clustering of a second viewpoint, a region corresponding to the point is selected as the representative region. In other words, the selection unit 144 performs clustering on a plurality of unknown object candidate regions from a plurality of viewpoints, and preferentially selects, as the representative region, a region classified into a different cluster in each viewpoint from among the plurality of unknown object candidate regions.

Figure 8:
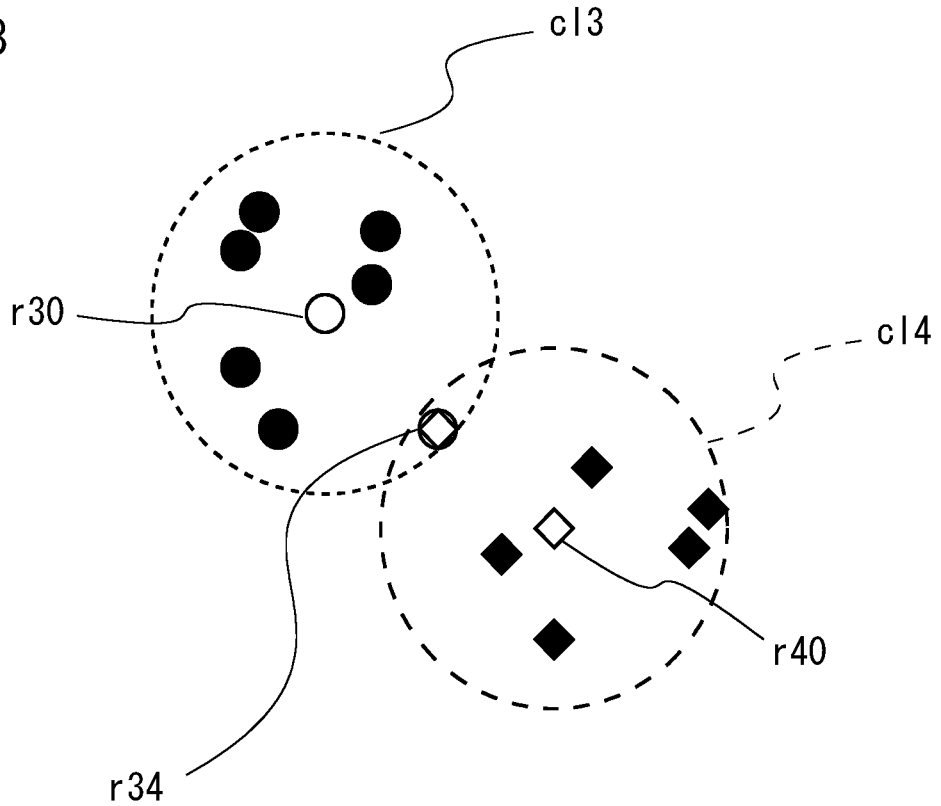
FIG. 8 is a diagram illustrating an example of selection of a representative region in clustering according to the first example embodiment.

FIG. 8 is a diagram illustrating an example of selection of a representative region in clustering according to the first example embodiment. Herein, it is illustrated that a point r34 is classified into both clusters cl3 and cl4. Herein, the cluster cl3 is a cluster by clustering of the first viewpoint, and the cluster cl4 is a cluster by clustering of the second viewpoint. For example, the cluster cl3 is a cushion, and the cluster cl4 is a cloth. Alternatively, the cluster cl3 is a pedestrian, and the cluster cl4 is a police officer.

Returning to FIG. 6, the description will be continued. The output unit 145 outputs the representative region group and the change detection failure region group as labeling targets (S110). For example, the output unit 145 outputs to a display device connected to the learning apparatus 100 via the IF unit 130 or a display device of a terminal apparatus connected via a communication line. Then, the display device displays, on a screen, each region of the accepted representative region group and the accepted change detection failure region group.

Herein, the output unit 145 may collectively output a plurality of representative regions classified into the same cluster by clustering as the same labeling target.

A user who sees a display content of the screen inputs or selects a label for each region. Alternatively, when a plurality of representative regions are displayed collectively on the screen, a user inputs or selects one label for the collective representative region group.

Thereafter, the learning unit 146 accepts designation of a label for each region in response to an input by a user (S111). In other words, the learning unit 146 receives information in which each region is associated with a label.

Then, the learning unit 146 generates learning data including the label and the region (S112). In other words, the learning unit 146 generates the labeled representative region as the learning data for the object detection model 112. In addition, the learning unit 146 generates a labeled change detection failure region as learning data for the background image model 113. Further, the learning unit 146 attaches the label attached to the representative region to other unknown object candidate region classified into the same cluster, and sets as the learning data.

Thereafter, the learning unit 146 learns the object detection model 112 by using the learning data of the labeled unknown object candidate region (S113). In addition, the learning unit 146 learns the background image model 113 by using the learning data of the labeled change detection failure region (S114).

Herein, one aspect of the problem to be solved by the present example embodiment will be described. When a recognition technique such as object recognition is applied to a general environment, an input other than an identification target may occur. In addition, recognition may be necessary in a new environment. For example, in a video surveillance system, there may be a time when it is necessary to detect a new target (e.g., a firefighter, or the like) in addition to an object (e.g., a pedestrian, or the like) registered as a detection target. In this case, although a region of an unlearned object can be detected by the background subtraction technique, the region cannot be discriminated, therefore manual labeling is required.

Further, the object detection technique and the background subtraction technique differ from each other in strong and weak fields of a detection region according to a content, a tendency, and a characteristic of a target image. For example, although the object detection technique has a low detection accuracy in an unknown learned object or an unknown scene, the background subtraction technique detects a change from a background image, thus, can detect the target object regardless of whether the object is not learned. On the other hand, in the background subtraction technique, it is difficult to distinguish between the target object and its shadow, and the detection accuracy of the region of the target object itself is low, but in the object detection technique, it can be said that the detection accuracy of the target object excluding the shadow is high.

Therefore, in the present example embodiment, a candidate region of a learning target is detected by combining the object detection technique and the background subtraction technique, and manual labeling is supported. Then, the recognition accuracy of each technique is improved by complementary learning of both techniques by using each region based on the attached label as learning data. In other words, it is possible to improve a recognition rate for an unregistered object with as little manpower as possible. For example, in a general object recognition application in a video surveillance system or the like, there is an advantageous effect particularly when an input cannot be limited.

Second Example Embodiment

A second example embodiment is a modification example of the first example embodiment described above. A detection unit according to the second example embodiment detects a candidate region for each of a plurality of images captured along a time series. Then, a selection unit selects, as a representative region, a part of a plurality of unknown object candidate regions existing at a corresponding position between the images. Herein, the corresponding position between the images means, for example, that coordinates are common, or that a range of a region is within a certain range. Then, a learning unit attaches a label attached to the representative region to other unknown object candidate region existing at a position corresponding to the representative region, and sets as learning data.

Figure 9:
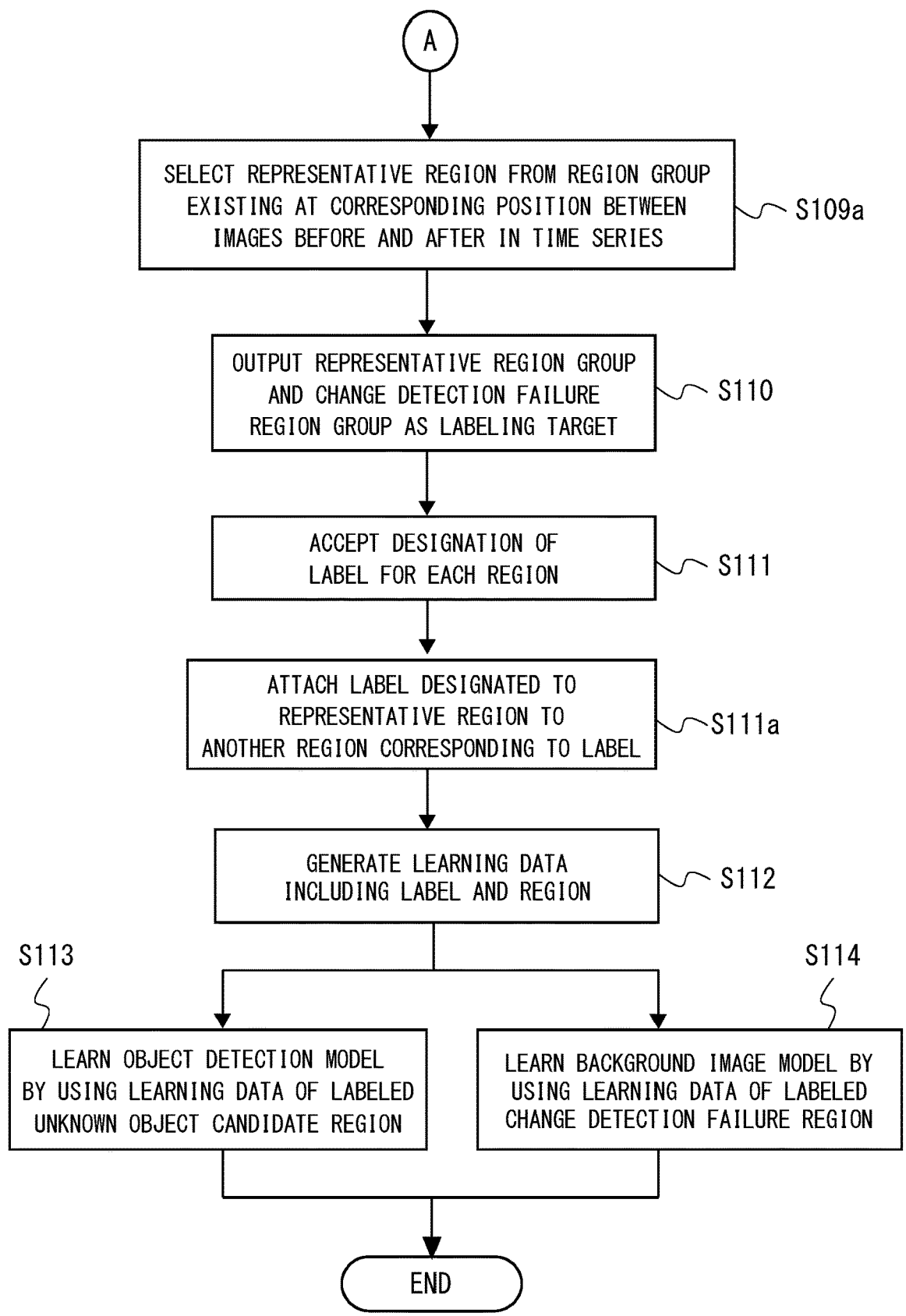
FIG. 9 is a flowchart illustrating a flow of a second half of a learning method according to a second example embodiment.

FIG. 9 is a flowchart illustrating a flow of a second half of a learning method according to the second example embodiment. In the second example embodiment, the steps S108 and S109 in FIG. 6 are replaced with step S109a, the step S111a in FIG. 6 is added and other steps are similar to those in the first example embodiment, and therefore, a repetitive description thereof is omitted.

In step S109a, a selection unit 144 selects a representative region from an unknown object candidate region group existing at a corresponding position with images before and after in time series. In response to this, in step S111a, a learning unit 146 attaches a label attached to the representative region to other unknown object candidate region existing at a position corresponding to the representative region, and sets as learning data for an object detection model 112.

As described above, in the second example embodiment, a fact that there is a high possibility that the candidate region is the same unknown object in the frame images before and after in the time series is used. Therefore, there is a high probability that the label attached to the representative region is also common to the candidate region in the frame images before and after associating the positions. Thus, it is possible to support a user to perform labeling efficiently.

Third Example Embodiment

A third example embodiment is a modification example of the first or second example embodiment described above. A detection unit according to the third example embodiment detects a candidate region for each of a plurality of images captured along a time series. Then, an output unit collectively output, as same labeling targets, a plurality of candidate regions existing at an associated position between images. Therefore, a selection unit is not essential.

Figure 10:
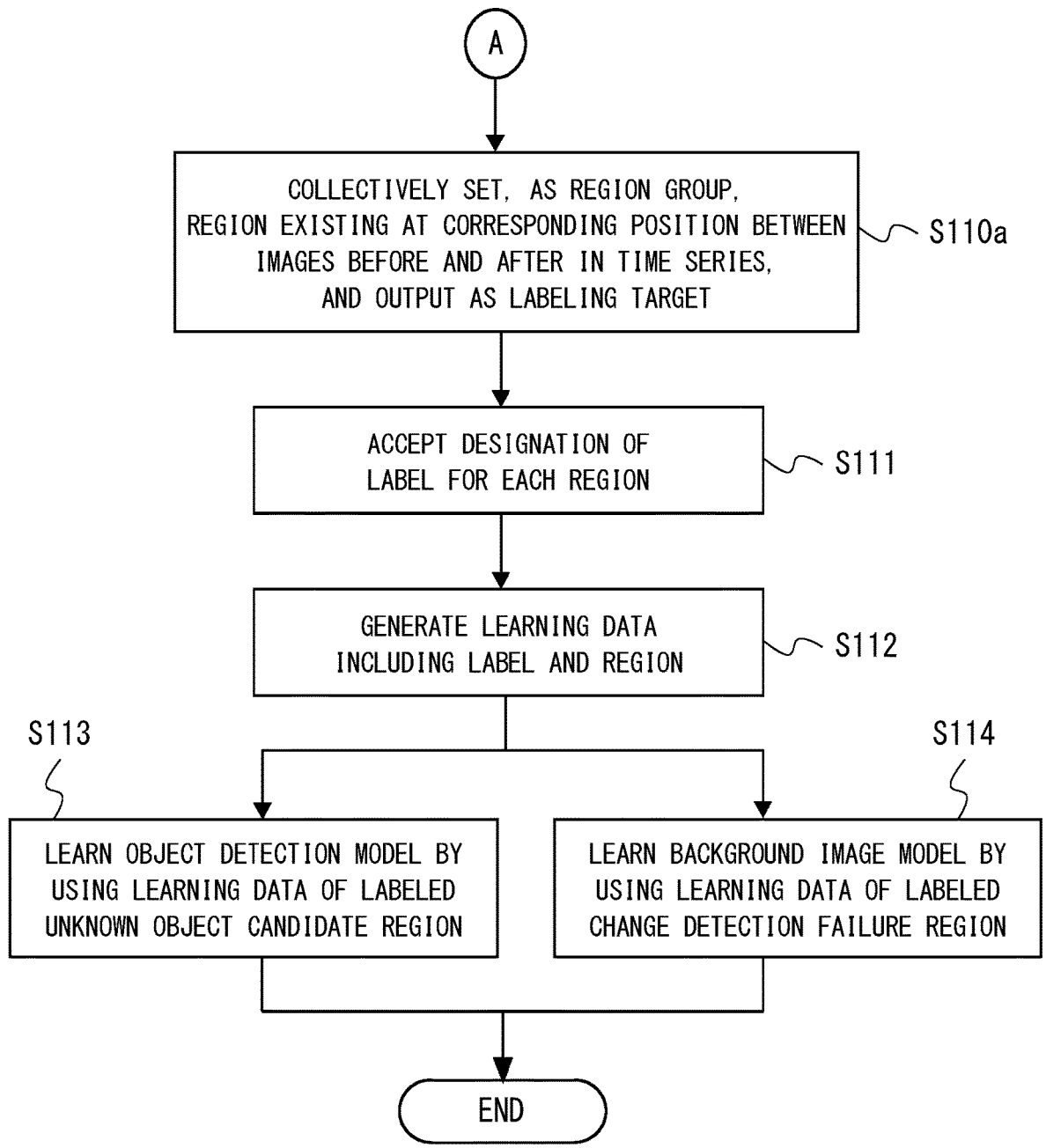
FIG. 10 is a flowchart illustrating a flow of a second half of a learning method according to a third example embodiment.

FIG. 10 is a flowchart illustrating a flow of a second half of a learning method according to the third example embodiment. In the third example embodiment, the steps S108, S109, and S110 in FIG. 6 are replaced with step S110a, and other steps are similar to those in the first example embodiment, and therefore, a repetitive description thereof is omitted.

In step S110a, an output unit 145 collectively sets, as a region group, a plurality of candidate regions existing at an associated position between images before and after in time series, and outputs as a labeling target. Herein, it is assumed that the region group is divided into an unknown object candidate region group and a change detection failure region group.

As described above, in the third example embodiment, a fact that there is a high possibility that the candidate region is the same unknown object in the frame images before and after in the time series is used. Therefore, there is a high probability that a label attached to a representative region is also common to the candidate region in the frame images before and after associating positions. In addition, even when frame images are continuously captured, there is a possibility that the same object is detected as a different object depending on illumination and a capturing state. Even in such a case, it is easy for a user to determine whether being the same object, that is, the same label should be applied by collectively providing, to a user, the regions existing at the associated positions between images before and after. Thus, it is possible to support a user to perform labeling efficiently.

Fourth Example Embodiment

A fourth example embodiment is a modification example of the first to third example embodiments described above. An output unit according to the fourth example embodiment outputs a label candidate corresponding to a cluster in which a representative region is classified, together with the representative region. Further, when clustering of a plurality of viewpoints is performed by a selection unit, the output unit may output a plurality of label candidates corresponding to each cluster in which a representative region is classified, together with the representative region.

Figure 11:
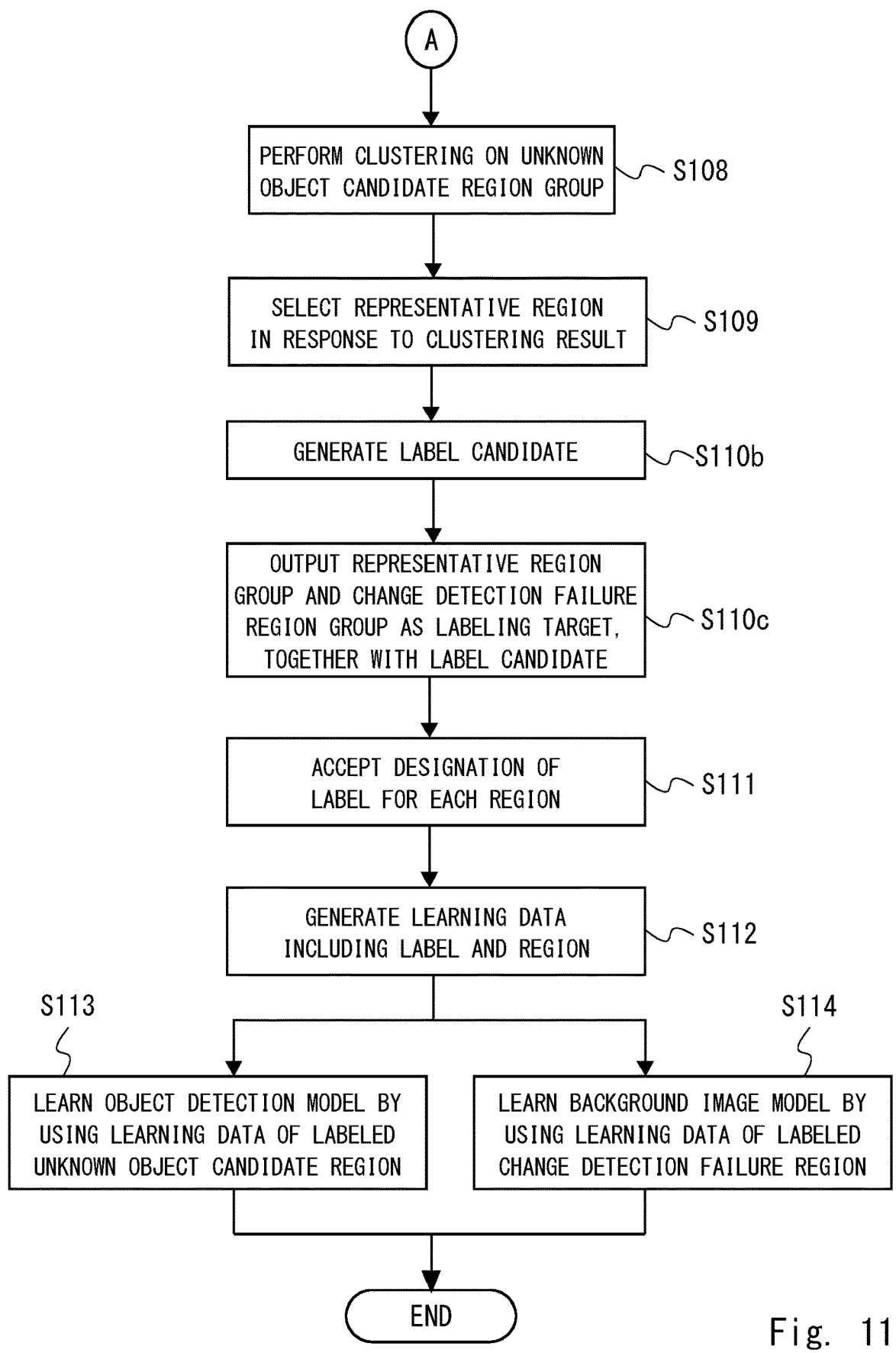
FIG. 11 is a flowchart illustrating a flow of a second half of a learning method according to a fourth example embodiment.

FIG. 11 is a flowchart illustrating a flow of a second half of a learning method according to the fourth example embodiment. In the fourth example embodiment, the step S110 in FIG. 6 is replaced with steps S110b and S110c, and other steps are similar to those in the first example embodiment, and therefore, a repetitive description thereof is omitted.

In step S110b, an output unit 145 generates a label candidate corresponding to a cluster into which a representative region is classified. For example, a label attached to a cluster is set as a label candidate. Then, in step S110c, the output unit 145 sets a representative region group and a change detection failure region group as labeling targets, and outputs together with the label candidate.

In response to this, a display device displays, on a screen, the label candidate corresponding to each region of the accepted representative region group and the accepted change detection failure region group. Then, a user inputs or selects a label with reference to the label candidate displayed together with each region.

As described above, according to the fourth example embodiment, it is possible to support a user to perform labeling efficiently.

Note that, the output unit may derive a related word related to a word in text data describing the image, based on a predetermined language model, and output the related word together with the candidate region as a label candidate. Herein, it is assumed that text data for describing an image is given in advance to an unlearned scene image. For example, in the case in FIG. 3, it is assumed that an explanatory sentence (text data) such as "a room in which a sofa is placed" is given. Further, the language model is information such as a corpus that systematically defines associations among a plurality of words. Then, it is assumed that a storage unit 110 of a learning apparatus 100 holds the text data of the explanatory sentence in association with an unlearned scene image 111, and also holds the language model. Note that, the language model may refer to an external database.

Then, for example, in the case in FIG. 5, the output unit 145 refers to the language model, derives a related word "cushion" related to a word "sofa" in the text data, and outputs the related word "cushion" together with unknown object candidate regions 231 to 232 as a label candidate. When a user confirms the unknown object candidate region 231, the user can designate, as a label, "cushion" as the label candidate. In such manner, it is possible to support a user to perform labeling efficiently.

Fifth Example Embodiment

Figure 12:
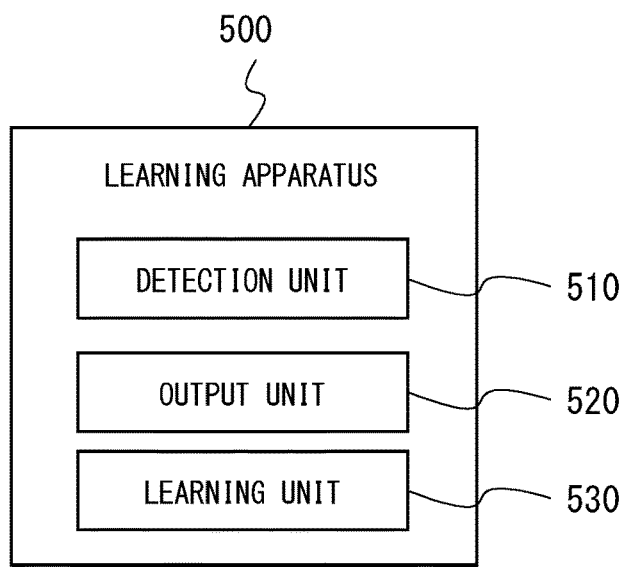
FIG. 12 is a block diagram illustrating a configuration of a learning apparatus according to a fifth example embodiment.

A fifth example embodiment is simplified of the first to fourth example embodiments described above. FIG. 12 is a block diagram illustrating a configuration of a learning apparatus 500 according to the fifth example embodiment. The learning apparatus 500 includes a detection unit 510, an output unit 520, and a learning unit 530.

The detection unit 510 detects, as a candidate region of a learning target, a region detected by one of first detection processing and second detection processing and not detected by the other. Herein, the first detection processing is processing of detecting an object region from a predetermined image, and the second detection processing is processing of detecting a change region from background image information and the image. Note that, the background image information is not limited to the background image model 113 described above, and may be a plurality of images before and after a predetermined image in time series. Alternatively, the background image information may be background image data predetermined for a predetermined image. The output unit 520 outputs at least a part of the candidate region as a labeling target. The learning unit 530 learns a model for performing the first detection processing or a model for performing the second detection processing by using the labeled candidate region as learning data.

Figure 13:
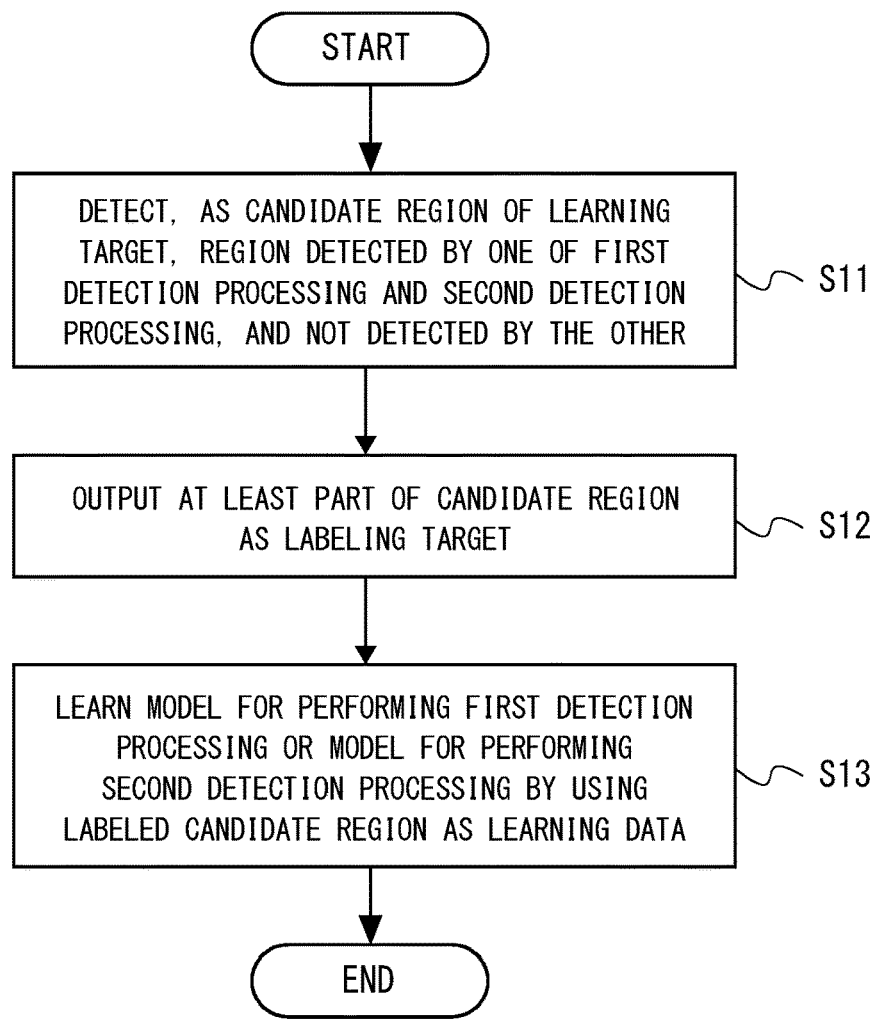
FIG. 13 is a flowchart illustrating a flow of a learning method according to the fifth example embodiment.

FIG. 13 is a flowchart illustrating a flow of a learning method according to the fifth example embodiment. First, the detection unit 510 detects, as a candidate region of a learning target, a region detected by one of the first detection processing and the second detection processing, and not detected by the other (S11). Next, the output unit 520 outputs at least a part of the candidate region as a labeling target (S12). Then, the learning unit 530 learns a model for performing the first detection processing or a model for performing the second detection processing by using the labeled candidate region as learning data (S13).

As described above, in the present example embodiment, since an unlearned candidate region is detected from detection results of the first detection processing and the second detection processing and learned after being labeled by a user, it is possible to improve a recognition rate of an object in an image. In addition, since the region is narrowed down to an undetected region in one of the two of detection processing, it is efficient to allow a user to label the region.

Note that, the learning apparatus 500 includes a processor, a memory, and a storage device as a configuration not illustrated. Further, the storage device stores a computer program in which processing of the learning method according to the present example embodiment is implemented. The processor then causes a computer program to be read from the storage device into the memory, and executes the computer program. Thus, the processor achieves functions of the detection unit 510, the output unit 520, and the learning unit 530.

Alternatively, each of the detection unit 510, the output unit 520, and the learning unit 530 may be achieved by dedicated hardware. In addition, a part or all of each component of each apparatus may be achieved by general-purpose or dedicated circuitry, a processor, or the like, or a combination thereof. These may be configured by a single chip, or may be configured by a plurality of chips connected via a bus. A part or all of each component of each apparatus may be achieved by a combination of the above-described circuitry or the like and a program. Further, as the processor, a central processing unit (CPU), a graphics processing unit (GPU), a field-programmable gate array (FPGA), or the like can be used.

When a part or all of each component of the learning apparatus 500 are achieved by a plurality of information processing apparatuses, a plurality of pieces of circuitry, and the like, the plurality of information processing apparatuses, the plurality of pieces of circuitry, and the like may be centrally arranged or distributedly arranged. For example, the information processing apparatus, the circuitry, and the like may be achieved as a form, such as a client-server system and a cloud computing system, that each of them is connected with each other via a communication network. Further, a function of the learning apparatus 500 may be provided in a software as a service (SaaS) form.

Other Example Embodiment

Note that, in the second example embodiment, similarly to the first example embodiment, after performing the steps S108 and S109 in FIG. 6 (clustering and selection of a representative region by a selection unit), the selection unit may select a representative region from a representative region group or a change detection failure region group existing at a corresponding position between images before and after in time series.

Further, in the third example embodiment, similarly to the first example embodiment, after performing the steps S108 and S109 in FIG. 6 (clustering and selection of the representative region by the selection unit), an output unit may collectively set, as the region group, the representative region group or the change detection failure region group existing at the associated position between images before and after in time series.

Note that, in the above example embodiment, a description is made as a hardware configuration, but the present invention is not limited thereto. The present disclosure can also be achieved by causing a CPU to execute a computer program.

In the above examples, a program may be stored by using various types of non-transitory computer-readable media, and supplied to a computer. A non-transitory computer-readable medium includes various types of tangible storage media. Examples of the non-transitory computer-readable medium include a magnetic recording medium (e.g., a flexible disk, a magnetic tape, a hard disk drive), a magneto-optical recording medium (e.g., a magneto-optical disk), a CD-read only memory (CD-ROM), a CD-R, a CD-R/W, a digital versatile disc (DVD), and a semiconductor memory (e.g., a mask ROM, a programmable ROM (PROM), an erasable PROM (EPROM), a flash ROM, a random access memory (RAM)). Further, the program may also be supplied to the computer by various types of transitory computer-readable media. Examples of the transitory computer-readable medium include an electrical signal, an optical signal, and an electromagnetic wave. The transitory computer-readable medium may supply the program to the computer via a wired communication path such as an electric wire and an optical fiber, or a wireless communication path.

Note that, the present disclosure is not limited to the above-mentioned example embodiments, and can be appropriately changed within a range not deviating from the gist. Further, the present disclosure may be achieved by appropriately combining each of the example embodiments.

Some or all of the above example embodiments may also be described as the following supplementary note, but are not limited to the following.

(Supplementary Note A1)
A learning apparatus including:
a detection unit that detects, as a candidate region of a learning target, a region detected by one of first detection processing of detecting an object region from a predetermined image and second detection processing of detecting a change region from background image information and the image, and not detected by the other;
an output unit that outputs at least a part of the candidate region as a labeling target; and
a learning unit that learns a model for performing the first detection processing or a model for performing the second detection processing by using the labeled candidate region as learning data.

(Supplementary Note A2)
The learning apparatus according to supplementary not A1, further including a selection unit that selects, as a representative region, a part of a plurality of unknown object candidate regions being a set of regions detected by the second detection processing and not detected by the first detection processing from among the candidate regions,
wherein the output unit outputs the representative region as the labeling target.

(Supplementary Note A3)
The learning apparatus according to supplementary note A2, wherein the learning unit learns a model for performing the first detection processing by using the labeled representative region as the learning data.

(Supplementary Note A4)
The learning apparatus according to supplementary note A2 or A3, wherein the selection unit selects the representative region in response to a result of clustering for the plurality of unknown object candidate regions.

(Supplementary Note A5)
The learning apparatus according to supplementary note A4, wherein the selection unit selects, as the representative region, a region classified into a cluster whose label is unknown by the clustering.

(Supplementary Note A6)
The learning apparatus according to supplementary note A4 or A5, wherein the selection unit preferentially selects, as the representative region, a region within a predetermined range from each of the centers of a plurality of clusters by the clustering.

(Supplementary Note A7)
The learning apparatus according to supplementary note A4 or A5, wherein the output unit collectively outputs a plurality of the representative regions classified into the same cluster by the clustering as a same labeling target.

(Supplementary Note A8)
The learning apparatus according to supplementary note A4 or A5, wherein the selection unit selects, as the representative region, a part of unknown object candidate regions classified into the same cluster by the clustering, and
the learning unit attaches a label attached to the representative region to another unknown object candidate region classified into the same cluster, and sets as the learning data.

(Supplementary Note A9)
The learning apparatus according to any one of supplementary notes A4 to A8, wherein the output unit outputs a label candidate corresponding to a cluster in which the representative region is classified, together with the representative region.

(Supplementary Note A10)
The learning apparatus according to supplementary note A4 or A5, wherein the selection unit performs clustering on the plurality of unknown object candidate regions from a plurality of viewpoints, and preferentially selects, as the representative region, a region classified into a different cluster in each viewpoint from among the plurality of unknown object candidate regions.

(Supplementary Note A11)
The learning apparatus according to supplementary note A10, wherein the output unit outputs a plurality of label candidates corresponding to each cluster in which the representative region is classified, together with the representative region.

(Supplementary Note A12)
The learning apparatus according to supplementary not A1, wherein
the detection unit detects the candidate region for each of a plurality of images captured along a time series, and
the output unit collectively outputs a plurality of candidate regions existing at a corresponding position between images as a same labeling target.

(Supplementary Note A13)
The learning apparatus according to supplementary note A2 or A3, wherein
the detection unit detects the candidate region for each of a plurality of images captured along a time series,
the selection unit selects, as the representative region, a part of a plurality of unknown object candidate regions existing at a corresponding position between images, and
the learning unit attaches a label attached to the representative region to other unknown object candidate region existing at a position corresponding to the representative region, and sets as the learning data.

(Supplementary Note A14)
The learning apparatus according to any one of supplementary notes A1 to A13, wherein the detection unit further detects, as the candidate region, a region based on a degree of overlap between a first region detected by the first detection processing and a second region detected by the second detection processing.

(Supplementary Note A15)
The learning apparatus according to any one of supplementary notes A1 to A14, wherein the output unit derives a related word related to a word in text data describing the image, based on a predetermined language model, and outputs the related word together with the candidate region as a label candidate.

(Supplementary Note A16)
The learning apparatus according to any one of supplementary notes A1 to A15, wherein
the output unit outputs, as the labeling target, a change region candidate being a region detected by the first detection processing and not detected by the second detection processing from among the candidate regions, and the learning unit learns a model for performing the second detection processing by using the labeled change region candidate as the learning data.

(Supplementary Note B1)

A learning method including, by a computer:

detecting, as a candidate region of a learning target, a region detected by one of first detection processing of detecting an object region from a predetermined image and second detection process of detecting a change region from background image information and the image, and not detected by the other;

outputting at least a part of the candidate region as a labeling target; and learning a model for performing the first detection processing or a model for performing the second detection processing by using the labeled candidate region as learning data.

(Supplementary Note C1)

A learning program causing a computer to execute:

processing of detecting, as a candidate region of a learning target, a region detected by one of first detection processing of detecting an object region from a predetermined image and second detection processing of detecting a change region from background image information and the image, and not detected by the other;

processing of outputting at least a part of the candidate region as a labeling target; and processing of learning a model for performing the first detection processing or a model for performing the second detection processing by using the labeled candidate region as learning data.

The present application of the invention has been described above with reference to example embodiments (and examples), but the present application of the invention is not limited to the above example embodiments (and examples). Various modifications can be made to the configuration and details of the present application of the invention which can be understood by a person skilled in the art within the scope of the present application of the invention.

The present application of the invention has been described above with reference to the example embodiments, but the present application of the invention is not limited to the above. Various modifications can be made to the configuration and details of the present application of the invention which can be understood by a person skilled in the art within the scope of the invention.

REFERENCE SIGNS LIST

100 Learning apparatus
110 Storage unit
111 Unlearned scene image
112 Object detection model
113 Background image model
114 Learning program
120 Memory
130 IF unit
140 Control unit
141 Object detection unit
142 Change detection unit
143 Candidate detection unit
144 Selection unit
145 Output unit
146 Learning unit
21 Object detection target frame
211 Object region
212 Object region
22 Change detection target frame
221 Change region
222 Change region
223 Change region
224 Change region
225 Change region
231 Unknown object candidate region
232 Unknown object candidate region
233 Unknown object candidate region
cl1 Cluster
cl2 Cluster
cl3 Cluster
cl4 Cluster
r10 Center point
r20 Center point
r12 Point
r30 Center point
r40 Center point
r34 Point
500 Learning apparatus
510 Detection unit
520 Output unit
530 Learning unit

The invention claimed is:

1. A learning apparatus comprising:
at least one memory configured to store instructions; and
at least one processor configured to execute the instructions to:
detect, as a candidate region of a learning target, a region detected by one of first detection processing of detecting an object region from a predetermined image and second detection processing of detecting a change region from background image information and the image, and not detected by the other;
output at least a part of the candidate region as a labeling target; and
learn a model for performing the first detection processing or a model for performing the second detection processing by using the labeling target being labeled as learning data.

2. The learning apparatus according to claim 1, wherein the at least one processor is further configured to execute the instructions to:
select, as a representative region, a part of a plurality of unknown object candidate regions being a set of regions detected by the second detection processing and not detected by the first detection processing from among the candidate regions, and
output the representative region as the labeling target.

3. The learning apparatus according to claim 2, wherein the at least one processor is further configured to execute the instructions to:
learn a model for performing the first detection processing by using the labeled representative region as the learning data.

4. The learning apparatus according to claim 2, wherein the at least one processor is further configured to execute the instructions to:
select the representative region in response to a result of clustering for the plurality of unknown object candidate regions.

5. The learning apparatus according to claim 4, wherein the at least one processor is further configured to execute the instructions to:
select, as the representative region, a region classified into a cluster whose label is unknown by the clustering.

6. The learning apparatus according to claim 4, wherein the at least one processor is further configured to execute the instructions to:
select, as the representative region, a part of unknown object candidate regions classified into the same cluster by the clustering, and
attach a label attached to the representative region to another unknown object candidate region classified into the same cluster, and set as the learning data.

7. The learning apparatus according to claim 4, wherein the at least one processor is further configured to execute the instructions to:
preferentially select, as the representative region, a region within a predetermined range from each of the centers of a plurality of clusters by the clustering.

8. The learning apparatus according to claim 4, wherein the at least one processor is further configured to execute the instructions to:
collectively output a plurality of the representative regions classified into the same cluster by the clustering as a same labeling target.

9. The learning apparatus according to claim 4, wherein the at least one processor is further configured to execute the instructions to:
output a label candidate corresponding to a cluster in which the representative region is classified, together with the representative region.

10. The learning apparatus according to claim 4, wherein the at least one processor is further configured to execute the instructions to:
perform clustering on the plurality of unknown object candidate regions from a plurality of viewpoints, and preferentially selects, as the representative region, a region classified into a different cluster in each viewpoint from among the plurality of unknown object candidate regions.

11. The learning apparatus according to claim 10, wherein the at least one processor is further configured to execute the instructions to:
output a plurality of label candidates corresponding to each cluster in which the representative region is classified, together with the representative region.

12. The learning apparatus according to claim 2, wherein the at least one processor is further configured to execute the instructions to:
detect the candidate region for each of a plurality of images captured along a time series,
select, as the representative region, a part of a plurality of unknown object candidate regions existing at a corresponding position between images, and
attach a label attached to the representative region to other unknown object candidate region existing at a position corresponding to the representative region, and sets as the learning data.

13. The learning apparatus according to claim 1, wherein the at least one processor is further configured to execute the instructions to:
detect, as the candidate region, a region based on a degree of overlap between a first region detected by the first detection processing and a second region detected by the second detection processing.

14. The learning apparatus according to claim 1, wherein the at least one processor is further configured to execute the instructions to:
output, as the labeling target, a change region candidate being a region detected by the first detection processing and not detected by the second detection processing from among the candidate regions, and
learn a model for performing the second detection processing by using the labeled change region candidate as the learning data.

15. The learning apparatus according to claim 1, wherein the at least one processor is further configured to execute the instructions to:
detect the candidate region for each of a plurality of images captured along a time series, and
collectively output a plurality of candidate regions existing at a corresponding position between images as a same labeling target.

16. The learning apparatus according to claim 1, wherein the at least one processor is further configured to execute the instructions to:
derive a related word related to a word in text data describing the image, based on a predetermined language model, and output the related word together with the candidate region as a label candidate.

17. A learning method comprising, by a computer:
detecting, as a candidate region of a learning target, a region detected by one of first detection processing of detecting an object region from a predetermined image and second detection process of detecting a change region from background image information and the image, and not detected by the other;
outputting at least a part of the candidate region as a labeling target; and
learning a model for performing the first detection processing or a model for performing the second detection processing by using the labeling target being labeled as learning data.

18. A non-transitory computer-readable medium storing a learning program causing a computer to execute:
processing of detecting, as a candidate region of a learning target, a region detected by one of first detection processing of detecting an object region from a predetermined image and second detection processing of detecting a change region from background image information and the image, and not detected by the other;
processing of outputting at least a part of the candidate region as a labeling target; and
processing of learning a model for performing the first detection processing or a model for performing the second detection processing by using the labeling target being labeled as learning data.

* * * * *